May 20, 1952 F. A. PEARSON 2,597,369
ALTERNATING CURRENT SYNCHRONOUS INDUCTION DISK MOTOR
WITH MEANS FOR ELIMINATING BACKLASH AND OVERRUN OF
GEAR TRAINS ASSOCIATED WITH ELECTRIC MOTORS
Filed Aug. 18, 1947  2 SHEETS—SHEET 1

INVENTOR
F. A. PEARSON

BY
Merrill M. Blackburn
ATTORNEY

May 20, 1952  F. A. PEARSON  2,597,369
ALTERNATING CURRENT SYNCHRONOUS INDUCTION DISK MOTOR
WITH MEANS FOR ELIMINATING BACKLASH AND OVERRUN OF
GEAR TRAINS ASSOCIATED WITH ELECTRIC MOTORS
Filed Aug. 18, 1947  2 SHEETS—SHEET 2

INVENTOR.
F. A. PEARSON
BY
Merrill M. Blackburn

Patented May 20, 1952

2,597,369

UNITED STATES PATENT OFFICE 2,597,369

ALTERNATING CURRENT SYNCHRONOUS INDUCTION DISK MOTOR WITH MEANS FOR ELIMINATING BACKLASH AND OVERRUN OF GEAR TRAINS ASSOCIATED WITH ELECTRIC MOTORS

Frank Arthur Pearson, Moline, Ill., assignor to Eagle Signal Corporation, Moline, Ill., a corporation of Massachusetts Application August 18, 1947, Serial No. 769,091

10 Claims. (Cl. 192—142)

This invention relates to an alternating current synchronous induction disc motor of an improved type having an electro-magnetically operated disengaging clutch and gear train. Among the objects of this invention are the provision of an improved motor of the synchronous induction disc type that is independent of ordinary commercial voltage fluctuations; the provision of an improved motor of the type indicated that produces a strong torque at synchronous speed; the provision of a motor of the type indicated with a light weight, fast acting clutch mounted on the disc rotor shaft that can be engaged to operate a gear train, or disengaged to stop and hold the gear train; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

A motor of this type has many applications, particularly in the timing field where a timing device employing a rotating timing dial, such as on a traffic signal controller, is to be accurately stopped or started for coordinating with other timers. Extreme accuracy of control is possible by means of this construction, since the clutch member is mounted on the fastest rotating element of the motor, namely, the rotor shaft.

Several timing devices may be set up to form a control system, each timing device being a separate unit provided with a rotating cycle dial driven by a disc synchronous motor. It is customary at the present time to so operate the control system as to cause rotation of the cycle dials at the same relative rate of angular speed and cause them to stop at approximately the same angular position. The angular speed is obviously obtained by operating the timing units with motors of like gear trains and an identical gear attached to each timing dial shaft.

The angular position is determined by a supervising contact and actuating cam attached to the cycle dial shaft in each unit. The motor clutch, according to the present invention, when actuated, will cause the timing dial on each unit to stop substantially instantly, since the ratio of the speed of turning of the cycle dial and the disc rotor of the motor, turning, for example, at the rate of 1 R. P. M. and 360 R. P. M., respectively, equals a ratio of 1 to 360. The fast acting clutch will usually disengage and stop the clutch within one-half revolution of the rotor.

In the drawings annexed hereto and forming a part hereof,

Figure 1:
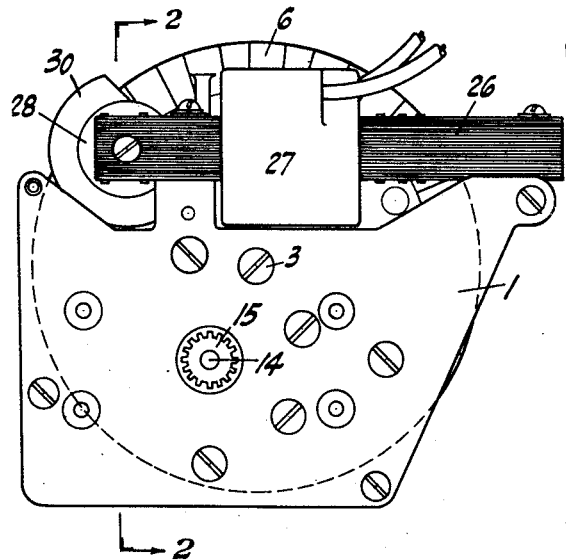
Fig. 1 is a side elevation of a motor in accordance with my present invention.

Reference will now be made in greater detail to the annexed drawings for a more complete description of this motor in which the frame plates 1 are connected by hollow bolts 2 and screws 2a which serve to hold the plates spaced a definite distance apart. Bearing elements 3 support a rotor shaft 4, having a hub 5 secured thereto. To this hub is secured a rotary disc 6 serving as the armature of the motor. This rotating disc is similar to the disc 15 of Jeffers Patent No. 2,378,556 or armature 1 of Harris Patent No. 1,571,199 and, therefore, does not need to be described in detail.

Figure 2:
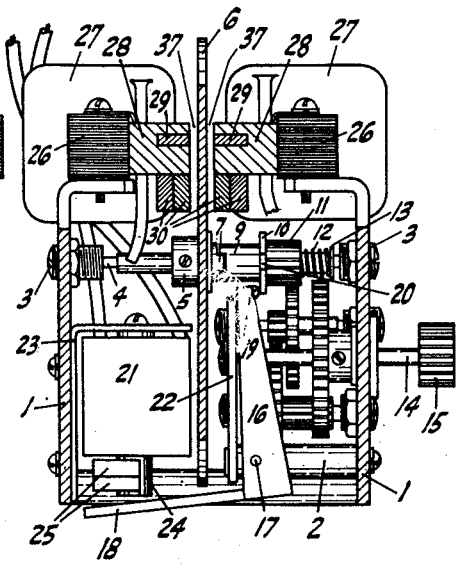
Fig. 2 represents a vertical, transverse section substantially along the plane indicated by the line 2—2, Fig. 1.

The part of the hub at the right of the disc 6 in Fig. 2 has a pair of projections 7 which cooperate with corresponding notches 8 in the sleeve 9, which sleeve is slidable on the shaft 4. This sleeve 9 is integrally connected with the flange 10 and pinion 11 so that the three parts 9, 10, and 11 slide together on the shaft 4. This assembly is moved in one direction by the spring 12, one end of which rests against the flange 13 secured to the shaft 4. By the term "clutch assembly," I mean the parts 9, 10, and 11 constituting the driving connection between the hub 5 and the rotor disc 6, on the one hand, and the gear train by which rotative power is transmitted to the driven unit, on the other hand. The final element of this gear train comprises the shaft 14 and pinion 15. This pinion 15 meshes with a pinion 15a on shaft 14a of the driven unit.

As the means for exerting pressure on the clutch assembly, in opposition to the spring 12, I provide a lever 16 which is pivotally mounted upon a pivot pin 17 and has an armature 18 connected thereto to cause oscillation of the lever about the pin 17, resulting in compression of the spring 12. At the upper end of the lever 16 is a horizontally extending arm provided with a V-shaped detent or projection 19 which cooperates with one or the other of a pair of notches 20 oppositely arranged in the edge of the flange 10, to stop the rotation of the clutch assembly and the gear train. The arm at the upper end of the lever 16 carries the detent 19 into position to engage the flange 10 and the notches 20 therein. When the armature 18 is drawn upwardly toward the electromagnet or solenoid 21, the horizontal arm at the upper end of the lever 16 swings into engagement with the flange 10 to move the clutch assembly toward the right, as viewed in Fig. 2, thus opening the clutch. When the electromagnet 21 is deenergized, the armature 18 drops, as shown in Fig. 2, from the position shown in Fig. 3, and, in doing so, pulls the horizontal arm at the upper end of the lever 16 into engagement with the frame element 22 which therefore serves as a stop for the lever 16 and keeps the armature 18 within the magnetic field of the electromagnet 21. The coil of the electromagnet 21 is supported by a bracket 23 mounted on one of the frame plates 1. The core of the electromagnet 21 is indicated at 24, and this has shaded poles 25 on one end thereof.

Figure 5:
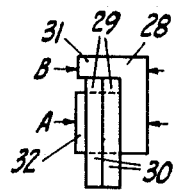
Fig. 5 is an elevation of a shaded pole of one of the field pieces of the motor.
Figure 7:
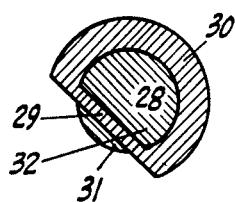
Fig. 7 is a transverse section of the structure shown in Fig. 5.

To produce a torque on the disc 6, to cause rotation thereof, there are provided laminated cores 26 which are surrounded by coils 27, similar to the arrangement in Hall Patent No. 1,234,465. The field elements 26 have pole pieces 28 secured thereto which project into close proximity to the rotary disc 6. These pole pieces 28 are slotted longitudinally, as indicated in Fig. 7, for the reception of the cross-bars 29, constituting parts of the shading coils 30. The minor part 31 of each pole piece is slightly shorter than the major part 32 thereof, as is clear from Fig. 5 in which this difference is magnified. However, this difference in length, A—B, is very slight, being only approximately eight-thousandths of an inch (.008"), so that the major part 32 projects by that amount nearer to the rotary disc than the minor part 31. The reason for this difference is to reduce and/or diffuse the density of the magnetic flux between the parts 31 relatively to the parts 32 so that the motor will produce a good starting torque without the tendency to "lock" the rotor at certain angular positions.

The pole pieces 28 are secured to the field elements 26 by means of screws. This type of mounting provides a means for adjusting the shifting magnetic field by rotating the pole pieces. This feature can be and has been used as a compensating means to take care of the variations encountered in manufacturing a motor in commercial quantities. The object of the present invention was to build a motor so the pole pieces 28 could be pre-set and secured to the field elements 26, thus enabling production of these motors without the necessity of shifting the pole pieces which would require special skill and would produce motors which were not uniform as to the location of the pole pieces with respect to the rotation of the discs. The present construction makes possible the production of these motors on a production line scale without the necessity of shifting the pole pieces for each motor to adjust it to a particular speed.

Figure 6:
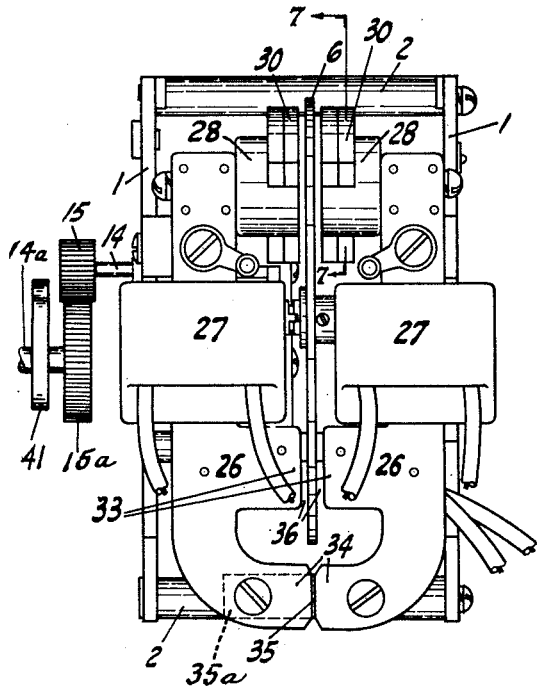
Fig. 6 is a plan view of the motor.

Adjacent the ends of the field elements or field pieces 26, remote from the pole pieces 28, are other pole pieces 33 which are spaced sufficiently to permit the disc 6 to rotate between them, in close proximity thereto, as shown in Fig. 6. At the end of the field pieces 26, near the unshaded poles 33, are other unshaded poles 34 separated by the air gap 35 for the insertion of an adjustment shim 35a for the regulation of the ratio of the flux between the poles 33 and 28. The shim 35a is bent at a right angle, one arm extending into the air gap 35 and the other between one pole 34 and the supporting bar 2. It is held in position by one of the screws which hold the pole pieces 34 properly positioned. However, the poles 34 can be so designed that no shim is necessary. Between the unshaded poles 33 is the rotary disc 6, and between this and the poles 28 are air gaps 37 which are sufficient to permit free turning of the disc between the pole pieces. Likewise, between the unshaded poles 33 and the rotor 6 are air gaps 36.

The disc is caused to rotate by the shifting magnetic flux produced across the rotor gap between pole pieces 28 in a manner well known to those familiar with the art. The lineal speed of this shifting magnetic flux produces a torque on the rotor which would normally cause the rotor to rotate at an angular speed greatly in excess of the required synchronous speed. This tendency to rotate at an excessive speed is suppressed by the braking effect of the disc rotor passing through the air gap of the field pieces 33. The magnetic flux through the field elements 26 flows through a primary path across the rotor gap between the shaded poles 28 and the adjustment gap 35. A portion of the magnetic flux is caused to flow through the shorter magnetic circuit across the unshaded rotor gap 36.

A retarding effect on the rotating disc rotor of the non-shifting magnetic flux across the rotor gap poles 33 is apportioned for the proper strength by the size and shape of the field elements 26 at the adjustment gap 35. This apportionment is also controlled by the spacing of the adjustment gap. The gap is adjusted by inserting or removing a shim or shims 35a of different dimensions. This adjustment may be used as a compensating means in place of rotating the field pole pieces 28, and has also been found useful in motors operated on a different frequency. This means of adjustment makes it possible to operate this motor on a lower frequency by changing a minimum number of components, such as field coils, and the adjustable pole pieces 28. The results produced on the motor are similar to that described in Hall Patent No. 1,234,466, the difference, however, being that I do not use a shaded pole to produce a counter shifting magnetic flux for the retarding effect. The results produced are, namely, that the increased torque produced in the shaded rotor gap 37 by a rise or fall in the power supply voltage will be approximately correspondingly offset by a similar change in the retarding effect across the rotor gap 36. When the disc rotor comes up to synchronous speed, the rotor locks in with the frequency of the alternating magnetic flux produced across both of the rotor gaps 36 and 37. This combination produces the strong synchronous torque.

Figure 3:
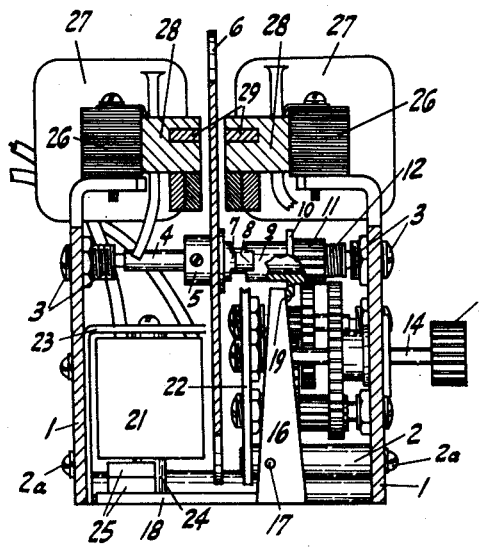
Fig. 3 is a view similar to Fig. 2 with certain parts adjusted to different positions.
Figure 4:
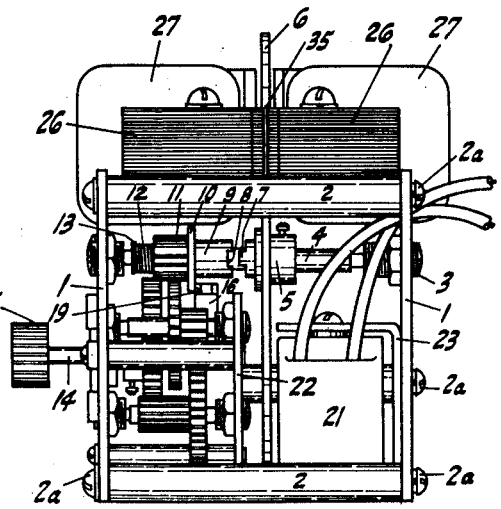
Fig. 4 is a view in the opposite direction from Figs. 2 and 3, showing the motor in elevation.
Figure 8:
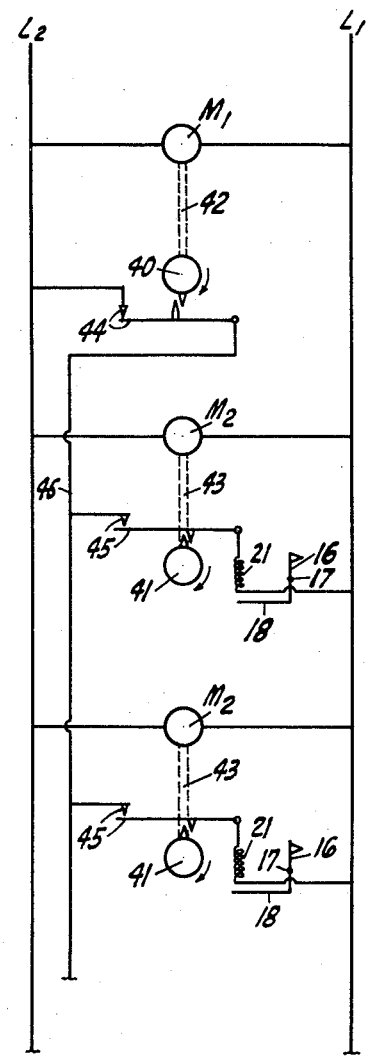
Fig. 8 is an across-the-line diagram illustrating the operation of this construction.

In Fig. 8, the power lines, as is quite common, are indicated by $L_1$ and $L_2$. The motor of the master timer is denoted by $M_1$ and of the local or secondary timers by $M_2$. The switch actuating cam of the master timer is indicated by the numeral 40 and of the local units by 41. The driving connections between the motors and the cams are indicated, respectively, by 42 and 43, and each includes a gear train, as shown in Figs. 2, 3, and 4. As indicated, the motors M1 and M2 are connected between the power lines L1 and L2 and therefore run constantly. The supply of current to the electromagnets 21 of the secondary or supervised timers is controlled by switches 45 governed by the cams 41, the latter being operated from the motors M2 through the gear train referred to above. It is clear that, when cam 40 causes opening of switch 44, current will be prevented from reaching coils 21 and, therefore, the clutches will be closed at 7, 8, as shown in Fig. 2, with the result that the local motors will continue to run until such time as cams 41 of the local timers cause closure of switches 45 and opening of the clutches of these local units. It is also clear that, when cam 40 is not holding switch 44 open, current will be supplied through conductor 46 to switches 45, if they are closed, in which event the local clutches will be opened and the operation of the timer dials will be stopped. If, through inadvertence, one of the local timers shoud be temporarily stopped, it will again be started simultaneously with the other locals at the beginning of the next cycle, so that the timers will again be in step.

Assuming that this motor is used as the actuating unit for a cycle timing unit and that in a timing system there are several such units, there will be a master or supervisory timer which will include in its timing circuit an electromagnet 21 of each of the supervised motors. Then, when the master or supervising timer control circuit switch is opened, each of the coils 21 will be de-energized, resulting in the closing of all the clutches and the starting of the gear train in each of the motors, unless the units are in step with the supervising timer, in which case nothing happens. If, on the other hand, the switch of the circuit of one or more electromagnets 21 is closed before the switch of the supervisory timer is opened, the gear train of the corresponding supervised timer will be stopped until the supervising timer catches up with the stopped supervised timer. Since the stopping of the gear train is substantially instantaneous, the units will be kept in step. Energizing the electromagnets 21 does not stop the rotation of the disc 6, and the motors therefore continue to operate at constant speed. Therefore, when the electromagnets 21 are de-energized, by the opening of switches 45, the motors are functioning at synchronous speed and take up the driving of the timing units instantly upon closing the clutches 7, 8 so that there is no lag which might get them out of step. It will be understood from the foregoing that the opening of the supervising contact of the master timer will result in simultaneous release of all the clutch armatures of the motors of the timer system and the starting of the several gear trains, thus keeping the timers always in step, i. e., with the timer dials at a given angular position.

By the term "supervising circuit," as used in the present specification and claims, I refer to the primary control circuit which controls the functioning of the secondary circuits, and by the term "supervisory circuit," I refer to the secondary circuits which have a self-supervising function.

It is of course understood that the specific description of structure set forth above may be departed from without departing from the spirit of this invention as disclosed in this specification and as defined in the appended claims.

Having now described my invention, I claim:

1. Controlling means for the driving connection between a driving motor and a driven unit; comprising a supporting framework, a shaft supported thereby and extending outwardly therefrom, said shaft carrying a pinion for connection to the gear train of the driven unit to cause operation thereof, a driving shaft, a gear train connecting the second mentioned shaft in driving relation with the first mentioned shaft, the second shaft having a clutch part fixedly connected thereto and a second clutch part on the said second shaft and cooperating with the first clutch part in driving the gear train from the second shaft, a flange extending radially outwardly from the slidable clutch part, an arm pivotally connected adjacent one of its ends to a fixed part of the framework and having its second end in position to engage said flange, when the arm turns about its pivot, and cause sliding of the clutch part along the shaft to cause disengagement of the clutch, a projection on the end of the arm engaging the flange, said flange having at least one notch in its edge to be engaged by said projection whereby to insure stoppage of the gear train in a minimum of time, and electromagnet means for turning said arm about its pivot to cause opening of the clutch and holding the gear train against motion.

2. In combination, a motor, a shaft rotated by said motor, a supervising circuit which is normally closed but periodically interrupted, a switch closed by said shaft at a given point of each shaft revolution, a clutch disconnecting said motor from said shaft, means for stopping and holding the shaft to prevent rotation thereof when said clutch is disengaged, a solenoid for actuating said clutch, and a circuit including said solenoid which causes current to energize the solenoid to disengage said clutch and stop rotation of said shaft when said switch closes before or after interruption of the supervising circuit.

3. The combination of a motor having a rotary member, a shaft rotated by said rotary member, a supervising circuit which is normally closed but periodically interrupted, a switch actuated by said shaft at a given point of each shaft revolution, a clutch disconnecting and reestablishing the driving connection of the rotary member and shaft, a solenoid for operating said clutch, and a circuit for actuating the solenoid including said switch whereby actuation of said switch before or after interruption of the supervising circuit causes the solenoid to disengage said clutch and to stop rotation of said shaft.

4. A unit having a rotating shaft, a second shaft driven by the first shaft, a switch closed by the second shaft at a given position thereof, a clutch for disconnecting the second shaft from the first shaft, a solenoid for disengaging said clutch and thereby stopping rotation of the second shaft, and a circuit for said solenoid in series with said switch and a supervising circuit which is normally closed but periodically interrupted, whereby closing of said switch before or after interruption of the supervising circuit causes energization of said solenoid to disengage said clutch and to stop rotation of the second shaft until the supervising circuit is interrupted, causing de-energization of the solenoid and starting of rotation of the said second shaft.

5. In a unit of the type stated, a timer, a gear train intermittently driving the timer at a constant speed, a continuously rotating disc driving the gear train intermittently, a clutch mechanism connecting the disc to the gear train and disconnecting it therefrom, the clutch mechanism having an outwardly projecting flange having a notch, an electromagnetically actuated lever cooperating with the flange to move the clutch parts into open position and stop the operation of the gear train, a projection on the lever, a spring moving the clutch parts into closed position, a shaft carrying the disc, a protuberance secured to the disc adjacent the shaft, and a slidable sleeve on the shaft having a depression adjacent the protuberance, the sleeve being slidable to clutch-engaging position when the electromagnet is deenergized, whereby to engage the clutch when the electromagnet is deenergized, and to move the sleeve away from the disc and disengage the clutch when the electromagnet is energized, thereby to stop the gear train when the electromagnet is energized and putting the timer into operating condition when the electromagnet is deenergized.

6. In a controller of the type indicated having a disc and a rotary shaft on which the disc is mounted, said disc having projections extending therefrom, a sleeve slidable on said shaft and having notches cooperating with said projections, said sleeve having a pinion constituting a part thereof and being slidable on the shaft, a lever having a pivot about which it may turn, said lever being engageable with a radially extending part of said sleeve to cause sliding thereof along the shaft and having a rounded contacting nose, said radially extending part being provided with at least one notch for engagement by said nose, and a gear train driven by said pinion, engagement of the nose with a notch in said radially extending part taking place substantially simultaneously with disengagement of the projection and notch and serving to stop the pinion and hold it stationary, thereby locking the gear train, said nose being tapered outwardly so that, if it engages a notch in said radially extending part before the notches and projections on the disc and sleeve disengage, the nose and cooperating notch will disengage, whereby to avoid injury to the controller.

7. In a driving mechanism for a timing instrument, a motor, one clutch member continuously driven by said motor, a second clutch member movable into engaged and disengaged positions with said first clutch member, yieldable means acting upon said second clutch member tending to keep said second member engaged with the first member, a flange having a notch on said second clutch member, a clutch-releasing means having a lever to press against said flange and open said clutch against the action of said yieldable means, and a projection on said lever to engage the notch in said flange during rotation thereof and lock the second clutch member against further rotation.

8. In a driving mechanism for a timing instrument, a motor, one clutch member continuously driven by said motor, a second clutch member movable into engaged and disengaged positions with said first clutch member, yieldable means acting upon said second clutch member tending to keep said second clutch member engaged with the first clutch member, a flange having a notch on said second clutch member, a lever having a projection for pressing against said flange and to engage said notch, means for holding said lever in a free position away from said flange, and an actuating means to move said lever against the flange and against the action of the yielding means, the actuating means causing engagement of the lever with said notch.

9. In a driving mechanism for a timing instrument, a motor, one clutch member having an engageable surface and continuously driven by said motor, a second clutch member movable into engaged and disengaged positions with said first clutch member, yieldable means acting on said second clutch member tending to keep said second clutch member engaged with the first member, a second engaging surface on said second clutch member, a clutch-releasing means having a lever operable to press against said second engaging surface and disengage said clutch against the action of said yieldable means, and locking means on said second engaging surface and said lever, said yielding means operable to hold said second clutch member locked to said lever upon actuation of said clutch releasing means.

10. In a driving mechanism for a timing instrument, a motor, one clutch member having one engageable surface and continuously driven by said motor, a second clutch member movable into engaged and disengaged positions with said first clutch member, yieldable means acting on said second clutch member tending to keep said second member engaged with the first member, a second engaging surface on said second clutch member, a lever operable to press against said second engaging surface and disengage said clutch against the action of said yieldable means, said lever normally positioned so it does not contact said second engaging surface, a solenoid for moving said lever against said second engaging surface to disengage the clutch, and locking means on said second engaging surface and said lever, said yielding means being operable to hold said second clutch member locked to said lever upon action of said solenoid.

FRANK ARTHUR PEARSON.

REFERENCES CITED

The following references are of record in the file of this patent:

UNITED STATES PATENTS

| Number | Name | Date |
|---|---|---|
| Re. 21,017 | Mellon | Feb. 28, 1939 |
| 470,797 | Wheeler | Mar. 15, 1892 |
| 990,999 | McGuire | May 2, 1911 |
| 1,234,465 | Hall | July 24, 1917 |
| 1,412,568 | Mortensen | Apr. 11, 1922 |
| 1,571,199 | Harris | Feb. 2, 1926 |
| 1,687,587 | Pearne | Oct. 16, 1928 |
| 1,884,140 | Nickel | Oct. 25, 1932 |
| 2,069,876 | Dorsett | Feb. 9, 1937 |
| 2,290,626 | Bosomworth | July 21, 1942 |
| 2,299,635 | MacNeil et al. | Oct. 20, 1942 |
| 2,378,556 | Jeffers | June 19, 1945 |

FOREIGN PATENTS

| Number | Country | Date |
|---|---|---|
| 448,267 | France | Nov. 21, 1912 |